June 6, 1967
A. BOSCHI
3,323,786
RESILIENT SUSPENSION SYSTEM, MORE PARTICULARLY FOR MOTOR VEHICLE
Filed April 28, 1965
3 Sheets-Sheet 1
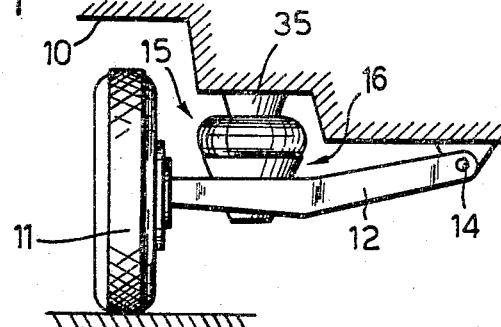
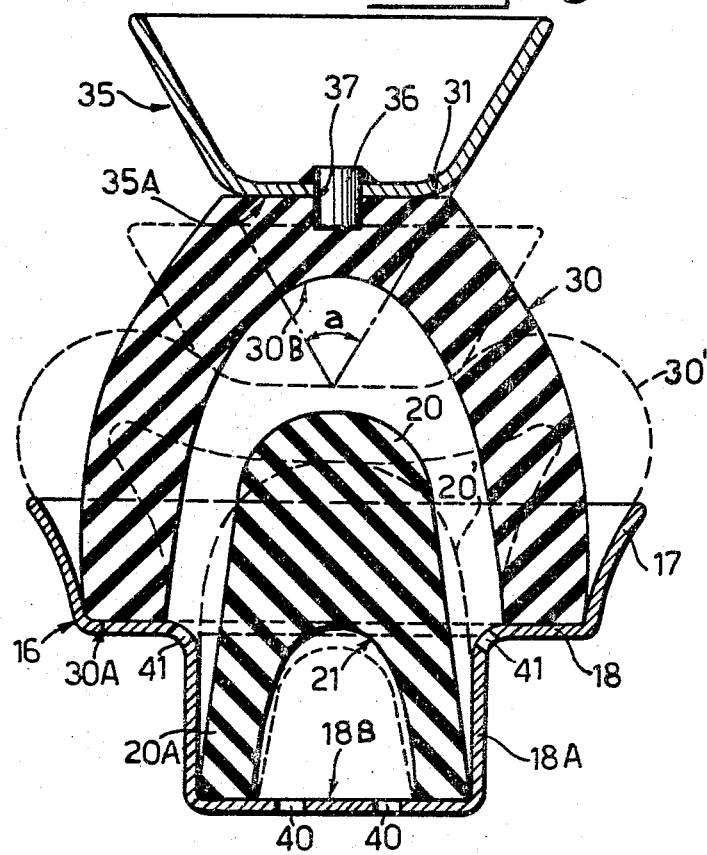

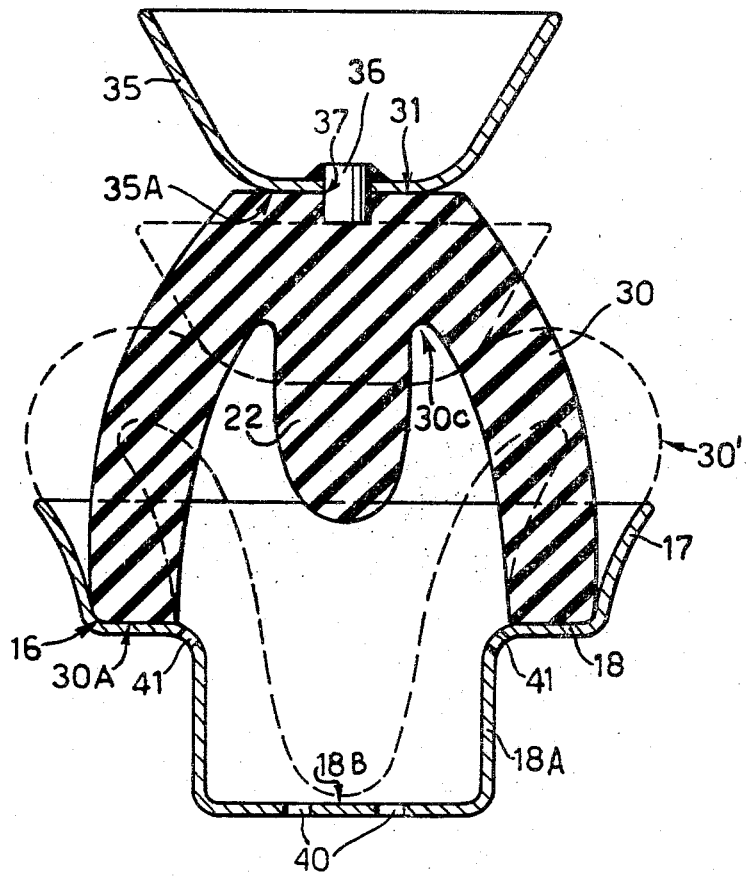

United States Patent Office 3,323,786
Patented June 6, 1967

3,323,786
RESILIENT SUSPENSION SYSTEM, MORE PARTICULARLY FOR MOTOR VEHICLE
Antonio Boschi, Milan, Italy, assignor to Società Applicazioni Gomma Antivibranti "SAGA" S.p.A., Milan, Italy
Filed Apr. 28, 1965, Ser. No. 451,466
Claims priority, application Italy, May 6, 1964, 9,878/64
13 Claims. (Cl. 267—63)

This invention relates to resilient suspension systems, more particularly for motor vehicles, having a progressive load-deflection characteristic diagram with a flex region, that is systems having a satisfactory flexibility around the average static load and characterized by a progressive stiffening towards the lower and higher loads.

As is known, flex-diagram progressive suspensions are particularly appreciated in the automotive industry field.

The diagram is hardly obtainable by means of a single spring member of the mechanical type (metal, rubber or rubber-metal spring); generally, two spring members at least, more or less satisfactorily combined together are requested. It is further known (compare ATZ Automobiltechnische Zeitschrift No. 10, October 1954, pages 272–274) to employ for this purpose resilient rubber members comprising a main spring and an assisting spring arranged between a pair of rigid load-applying members so as to give as a whole a progressive flex-diagram; however, the so obtained diagram results from a mutual shift of the points of attachment of the two springs, which requires complex mechanical connecting and guide members.

An object of this invention is to provide a resilient suspension system of the type comprising a primary spring and a secondary spring, both made of rubber and possibly integral with each other, arranged between a pair of rigid load-applying members so as to yield a progressive flex-diagram without requiring mechanical sliding members or even a vulcanized attachment of the rubber parts to the metal parts, thereby avoiding any danger of breakage and facilitating assembly and replacement of the rubber parts.

An ancillary object is to provide a system such that its characteristic diagram can be easily modified for the sake of an easy adjustment during tests or when requirements imposed upon the vehicle are modified.

A still further object is to employ, in the said system, rubber springs simple in structure and of low cost, in combination with similarly simple and inexpensive assembly work.

Further objects and advantages will be understood from the following description.

According to the broadest aspect of this invention the resilient system of the above defined type distinguishes by the following features: (a) the primary spring is of the cupola-type, having its base seated in a cup-shaped support forming one of the two rigid load-applying members and to the top of which fits the small end of a substantially frusto-conical piston acting as the second load-applying member, whereby the characteristic diagram of the primary spring alone exhibits, within the compression stroke of the system, an absolute maximum at the idle weight to be supported; (b) the secondary spring is of the compression type and is arranged in the cavity of the primary spring in order to be axially compressed between the bottom of the cavity and the cup-shaped support, said secondary spring exhibiting under axial compression load a characteristic diagram in which the rigidity does not decrease on increase of the load; (c) the said secondary spring is arranged in a spaced relationship from said bottom of the cavity in the primary spring or from said support so as to become effective in the system in the neighborhood of the idle weight to be supported.

The secondary spring can be seated in a recess formed in the bottom of the cup-shaped support to afford an increased stroke (deflection range) of the system.

Alternatively, the secondary spring can extend axially from the bottom of the primary spring (in this case it can be integral with the primary spring) and end a distance from the bottom of the cup-shaped support.

On the accompanying drawings:

FIGURE 1 is a diagrammatical view of a suspension of a motor vehicle constructed according to this invention;

FIGURE 2 is an axial sectional view of a resilient unit for the suspension according to FIGURE 1 in an embodiment in which the secondary spring extends axially from the bottom of the primary spring, the unit being shown in no-load conditions;

FIGURE 3 is an axial sectional view of a resilient unit for the suspension according to FIGURE 1 in no-load conditions, according to a further embodiment of this invention;

Figure 4:
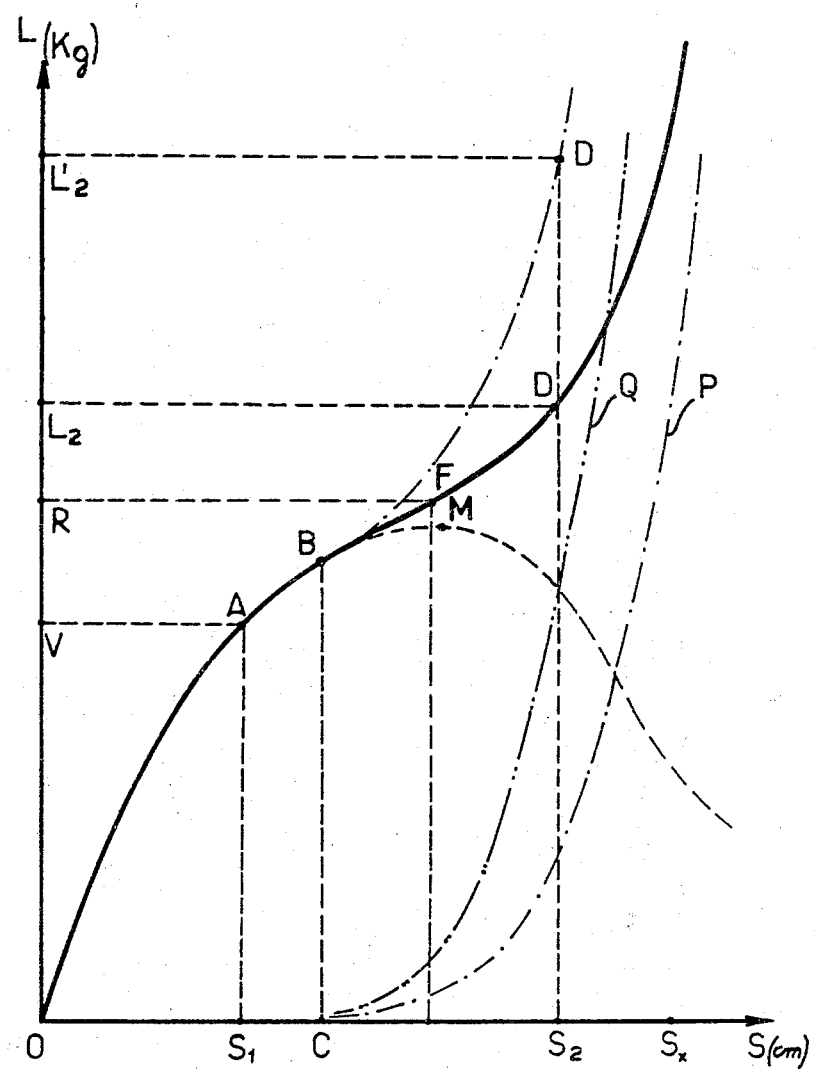
FIGURE 4 is a load-deflection diagram showing by way of example certain characteristic curves necessary for the understanding of this invention.

In FIGURE 1, 10 denotes a motor vehicle body, having a wheel 11 carried by a transverse swing-arm 12; the latter is pivoted by a hinge 14 to the bottom of the body 10. A resilient suspension unit 15 subjected to compression loads is interposed between an intermediate region of the arm 12 and the bottom of the body 10. This type of suspension is known in the art as "independent suspension" and does not require further explanations other than in respect of the resilient unit 15.

This unit, two embodiments of which are separately shown in FIGURES 2 and 3, comprises a circular cup-shaped support 16 of pressed sheet metal having a flared circumferential wall 17 and a flat bottom 18 but for a middle portion 18A forming a cylindrical sump ending by a bottom 18B. The support 16 is rigidly secured to the arm 12 (FIGURE 1) with its cavity turned towards the vehicle body 10.

In FIGURE 2 a primary spring 30 is coaxially arranged within the cup-shaped support 16 and comprises a circular cupola of rubber, the planar base 30A of which simply bears on the bottom 18 of the support 16 in direct proximity to the circumferential wall 17 in a slight interfit with the latter, to avoid any accidental transverse displacement of the base 30A. The top of the cupola 30 is flattened perpendicular to the axis of the latter, forming a planar face 31. Against this planar end face fits the planar front fact 35A of a piston 35 of a generally frusto-conical configuration, the apex of which is turned towards the support 16. The front face 35A of the piston has centrally welded thereto an axial stud 36 slightly forced into a corresponding axial recess 37 in the face 31 of the cupola 30. The piston is fast with the vehicle body 10 (FIGURE 1).

The primary spring 30 is formed on its inside portion 30C (opposite the planar end face 31) with an axially directed extension 22 integral with the primary spring 30, this extension acting as the secondary spring of the unit.

The freed end of the secondary spring 22 is axially spaced from the bottom 18B of the sump in the support 16 by an extent which shall be discussed hereafter.

According to FIGURE 3, the secondary rubber spring 20 is inserted into the sump 18A and is separate from the primary spring; the spring 20 is of a generally elongated frusto-conical shape, having its large end bearing against the bottom 18B of the sump, its small end being spherically rounded. The spring is formed adjacent its large end with a recess 21 of an approximately parabolic profile flaring towards the said end. The wall 20A of the spring 20 encircling the recess 21 of a considerable thickness so that it is stressed chiefly to axial compression under an axial load imposed on the spring; under these conditions the sidewall of the sump 18A acts to progressively limit the radial expansion of the outer frusto-conical surface of the spring (compare the dash line 20') thereby making the spring increasingly rigid on increase in load. The characteristic curve of the secondary spring is therefore of the "continuously increasing" character, as will be better understood hereinafter. From the mechanical standpoint the secondary spring 20 behaves just like a cupola (in architectural sense), loaded at its apex and bounded at its base against an excessive radial expansion capable of converting internal compression stresses (inherent to a cupola) to stresses of another nature (shear, bending stresses). Though the large end of the spring 20 might if desired be bonded to the bottom 18B of the sump 18A, such a connection is not strictly necessary; it should even preferably be avoided in order to facilitate both assembly on the spring and any replacement thereof.

Above the secondary spring 20 a main spring 30 is arranged coaxially with the former and comprises a rubber cupola, the base 30A of which simply bears on the bottom 18 of the cup-shaped support in the immediate proximity to the circumferential wall 17 with a slight interfit with the latter, in order to avoid accidental transverse displacements of the said base. The top of the cupola 30 is flattened perpendicular to the geometrical axis of the latter, thereby forming a planar face 31. The bottom 30B of the cupola is axially spaced from the top of the secondary spring 20 by an extent which shall be discussed hereafter.

Against the planar end face 31 fits the planar front face 35A of a piston 35. The latter is generally frusto-conically shaped with its apex turned towards the cup-shaped support 17 and with its apex angle, denoted by $a$, generally amounting to from about 30° to about 120°. The front face 35A of the piston has centrally welded thereto an axial stud 36 slightly forced into a cooperating axial recess 37 in the cupola 30, whereby the faces 31 and 35A are centered to each other. The piston 35 is fast with the body 10 (FIGURE 1) of the vehicle; according to an advantageous embodiment the piston can even be formed by a protuberance on the bottom of the vehicle body, factory-formed on pressing the said bottom, provided the latter is made of pressed sheet metal.

Otherwise, the piston 35 can be formed separatedly and adapted to be rigidly connected to the body 10 in any suitable manner.

It will be easily seen from FIGURES 1 and 2 that for assembly it will be sufficient to insert the resilient system comprising the primary spring 30 and secondary spring 22 into the cup-shaped support 16 and fit the stud 36 into the recess 37.

It will further be easily seen from FIGURES 1 and 2 that, for assembly, it will be sufficient to fit the secondary spring 20 into the sump 18A in the support 16, encase then the rubber cupola 30 into the same support 16 and fit the pin 36 into the recess 37, which can be carried out without requiring any special equipment; when effecting replacements this operation can even be carried out by the user of the car with the aid of the conventional lifting jack.

As distinct from a number of other rubber springs, the cupola springs exhibit under axial compression loads a characteristic curve which can be defined of the "camel's hump" type, as shown by the curve O-A-B-M in FIGURE 4. This is due to the fact that under a load as mentioned above the material of the cupola is subjected mainly to compression, as this was known to architects of old times; on increase in load the cupola tends to expand, so that compression stresses gradually change to bending and shear stresses (compare the segment A-B-M in FIGURE 4) which at a given moment (compare point M) prevail over the compression stresses. The point M is the maximum of the function: $L=f(S)$, wherein L denotes the load and S denotes deflection (yield). It should be noted that the segment O-A of the curve O-A-B-M exhibits a greater rigidity than the segment A-B, the latter being in turn more rigid than the segment B-M; in other words within the segment O-M the flexibility of the spring increases with load.

The exact form of the above described curve depends upon a number of variables, such as, for instance, the wall thickness of the cupola, width of its end face 31, profile of the cupola, inherent properties of the elastomer employed, freedom of the walls to expand, etc. A cupola spring which is fully free in respect of radial expansions is generally too flexible and is not very promising for use in the field of resilient suspensions of motor vehicles (unless in exceptional cases); this flexibility is, however, appreciably reduced when, as in the structure illustrated by FIGURES 2 and 3, the base of the spring is encircled by the wall 17 of the cup 16, of a profile such as to provide a progressively effective circumferential abutment for the wall of the cupola under increasing loads (compare dash line 30'). Moreover, the flexibility of the cupola spring is all the more reduced, as its wall thickness is greater and the diameter of the planar front face 31 increases. Generally, the said diameter should range between about 0.3 and about 0.6 times the mean diameter of the cupola base, it being understood that the said mean diameter is the arithmetical mean of the inner and outer diameters of the base 30A.

Assuming $S_x$ denotes the maximum admissible deflection under conditions of use (FIGURE 4), the parameters of the cupola spring 30 are selected so that its maximum value M is between the said value $S_x$ and value $S_1$ corresponding to the minimum load V on the spring. A suitable secondary spring 22 is then selected which, being spaced by an extent O-C from the bottom 18B of the support 16, or a secondary spring 20 which, being spaced by an extent O-C from the bottom 30B of the spring 30 (under no-load conditions), modifies the characteristic curve of the spring 30 to afford the desired "progressive diagram."

As a general rule, rubber springs of the type employed herein as secondary spring exhibit under axial compression loads characteristic curves which are, mathematically speaking, "steadily increasing functions."

In other words, if $L=F(S)$ defines the characteristic curve of one such spring, the first derivative $dL/dS$ is always positive and is steadily increasing with a tendency towards the infinite. In FIGURE 4 two characteristic curves P and Q of this kind are indicated.

Assuming the secondary spring 22 or 20 exhibits a characteristic curve like the one denoted by P and starts its compression performance between the bottom of the spring 30 and sump 10 only after the spring 30 has been deflected by an extent equalling O-C, in which the deflection C corresponds to a point B intermediate the points A and M of the characteristic curve of the spring 30, a resultant curve O-A-B-D is obtained, which is "progressive." In fact, such resultant curve affords a maximum flexibility at a region within the segment A-D and exhibits a progressive stiffening in both directions starting from the said middle region.

On designing, the primary and secondary springs can be proportioned so that the points on the characteristic curve corresponding to empty vehicle and fully loaded vehicle are included in the segment between the points A and D. Assuming, by way of example, that point A on the characteristic curve corresponds to idle load V of the vehicle and point F corresponds to maximum load R, in the just stated conditions the working point of the resilient unit will be comprised within the segment A-F, affording in any case a high flexibility directly around the said working point and a progressive stiffening in response to wide strokes of compression and rebound, as is desirable in motor vehicle suspensions.

On the other hand, should it be desirable to obtain at the end of the bottoming stroke (compare point D corresponding to values $S_2$ and $L_2$ of deflection and load, respectively) by the same deflection $S_2$ a resilient reaction of the unit exceeding the value $L_2$, a secondary spring can be selected having the necessary characteristic curve such as for instance the one denoted by Q; a resultant curve O-A-B-D' will thus be obtained, on which the bottoming deflection $S_2$ will encounter a reaction $L_2'$ greater than $L_2$. The working point will be still situated within the most favourable segment of the resultant curve.

Alternatively, in order to obtain substantially the same above described effect, a secondary spring of a characteristic P can be employed, but the spacing O-C should then be somewhat reduced, such as by interposing suitable shims between the secondary spring and the bottom 18B of the cup-shaped support 16.

As a further alternative, the secondary spring could be of a material even other than rubber or could be made of rubber in combination with other materials, such as in the form of a helical spring of steel or a rubber-metal spring, provided the feature of a rigidity which does not decrease with load is maintained.

From a theoretical standpoint, the form of the secondary spring to be associated with the primary cupola spring 30 is not critical: even a simple cylinder of rubber might yield a characteristic curve similar to those denoted by P and Q in FIGURE 4.

One of the advantages of the resilient system according to this invention consists in the fact that it does not generally require shock absorbers (telescopic or other), by virtue of the hysteresis of the elastomer material of which the two springs are made. However, a continuative hysteresis work generates considerable amounts of heat which should be continuously dissipated to avoid overheating in the elastomeric mass. To this end ventilating apertures 40, 41 (FIGURES 2 and 3) are formed in the cup-shaped support 16, through which air from the outside is pumped by virtue of the pumping effect of the primary spring during operation.

What I claim is:

1. In a resilient suspension system, a cupola-shaped, resilient first spring having a planar base surface, a cup-shaped first load-applying member having a circumferential wall within which said first spring is disposed limiting in operation outward deformation of a portion of said first spring having said planar base surface due to compression loading, a rigid, frustro-conical, second load-applying member having a small end, said first spring member having a surface opposed to said small end and on which said small end bears, said first spring having a deformation characteristic exhibiting maximum deflection within a given range of compression load values imposed on said system and progressively decreasing flexibility increasing at compression load values causing said maximum deflection, a compression-type second spring within said first spring exhibiting under compression loads a deformation characteristic in which deflection progressively increases with increased compression loads and ceases to increase upon additional increase of compression loads past a given value, said second spring disposed to cooperate with said first spring upon compression loading thereof and disposed between said first load-applying member and said first spring and dimensioned to become effective at a compression load value imposed on said system lower than and close to a compression load value at which said maximum deflection of said first spring takes place.

2. In a resilient suspension system according to claim 1, in which said second spring is separate from said first spring.

3. In a resilient suspension system according to claim 1, including means integrally joining said first spring and said second spring.

4. Resilient suspension system exhibiting a progressive load-deflection diagram including a flex region under increasing compression loads, comprising in combination:
 (a) a primary spring consisting of a cupola of rubber comprising a substantially planar base surface;
 (b) a load-applying member for said spring comprising a cup-shaped rigid support having a bottom wall supporting the base surface of the primary spring and a circumferential wall encircling a base-section of the spring to prevent radial expansion of said section under load;
 (e) a second load-applying member for said spring comprising a rigid frusto-conical piston having its small end fitted to the top of the cupola, whereby increasing loads applied by said member to the primary spring in a range of loads give a characteristic diagram for said spring exhibiting an absolute maximum within said range;
 (d) a secondary spring of the compression-type arranged in the cavity of the primary spring for being compression-loaded between the bottom of said cavity and the cup-shaped support, said secondary spring exhibiting under compression loads a characteristic diagram in which the rigidity does not decrease on increase of the load and being arranged so as to become effective between said bottom and support at a load (imposed on the system) substantially equal to said absolute maximum.

5. The system of claim 4, wherein the secondary spring axially projects from the bottom of the cavity in the primary spring towards the cup-shaped support and is spaced from the latter through a distance substantially equal to the deflection value of the primary spring at the said absolute maximum of the characteristic diagram.

6. The system of claim 4, wherein the secondary spring extends from the bottom wall of the support towards the bottom of the cavity in the primary spring and is spaced from the said bottom of the cavity through a distance substantially equal to the deflection vaue of the primary spring at the said absolute maximum of the characteristic diagram.

7. The system of claim 6, wherein the bottom wall of the support comprises a central recess and wherein the secondary spring is seated in said recess.

8. The system of claim 6, wherein the bottom wall of the support comprises a central recess, wherein moreover the secondary spring comprises a substantially frusto-conical body of rubber, and wherein the large end of the secondary spring is seated in said recess.

9. The system of claim 6, wherein the secondary spring comprises a substantially frusto-conical body of rubber having its large end supported by said support.

10. The system of claim 6, wherein the bottom wall of the support comprises a central recess, wherein moreover the secondary spring comprises a substantially frusto-conical body of rubber having a cavity therein flaringly opening on the large end of the body, and wherein said large end is seated in said cavity in a forced engagement.

11. The system of claim, wherein the apex-angle of the frusto-conical piston is from 30° to 120°.

12. The system of claim 4, wherein the top of the cupola comprises a substantially planar surface portion, which is perpendicular to the axis of the cupola and is engaged by the small-end of the piston.

13. In a resilient suspension system, a cupola-shaped, resilient first spring having a planar base surface, a cup-shaped first load-applying member having a circumferential wall within which said first spring is disposed limiting in operation outward deformation of a portion of said first spring having said planar base surface due to compression loading, a rigid frusto-conical, second load-applying member having a small end, said first spring member having a surface opposed to said small end and on which said small end bears, a compression-type second spring within said first spring disposed between said first load-applying member and said first spring and disposed to cooperate with said first spring upon compression loading thereof and dimensioned to become effective at a selected compression load value imposed on said system within a given range of compression load values impossible on said system, and said first spring and said second spring each having a deformation characteristic and a combined deformation characteristic according to FIG. 4.

References Cited

UNITED STATES PATENTS 3,118,659 1/1964 Paulsen _____ 267—1

FOREIGN PATENTS 123,934 4/1947 Australia.
506,156 8/1929 Germany.
23,589 10/1913 Great Britain.
736,733 9/1955 Great Britain.

ARTHUR L. LA POINT, *Primary Examiner*.

R. M. WHOLFARTH, *Assistant Examiner*.